United States Patent
Kuroiwa et al.

(10) Patent No.: US 7,007,202 B2
(45) Date of Patent: Feb. 28, 2006

(54) DEVICE AND METHOD FOR CHECKING BOOT ERROR IN INTERMITTENT RECEIVING OPERATION

(75) Inventors: Koichi Kuroiwa, Kawasaki (JP); Shoji Taniguchi, Kawasaki (JP); Masami Kanasugi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 559 days.

(21) Appl. No.: 10/223,468

(22) Filed: Aug. 20, 2002

(65) Prior Publication Data

US 2003/0115507 A1 Jun. 19, 2003

(30) Foreign Application Priority Data

Dec. 18, 2001 (JP) ............... 2001-384256

(51) Int. Cl.
*G06F 11/00* (2006.01)
(52) U.S. Cl. ................. 714/36; 713/1; 713/2
(58) Field of Classification Search ............ 714/36; 713/1, 2
See application file for complete search history.

(56) References Cited

U.S. PATENT DOCUMENTS

| | | | |
|---|---|---|---|
| 5,910,944 A | | 6/1999 | Callicotte et al. |
| 5,956,475 A | * | 9/1999 | Burckhartt et al. ........... 714/23 |
| 5,978,913 A | | 11/1999 | Broyles et al. |
| 6,381,694 B1 | * | 4/2002 | Yen ................. 713/2 |
| 6,640,316 B1 | * | 10/2003 | Martin et al. ................. 714/36 |
| 6,807,643 B1 | * | 10/2004 | Eckardt et al. ............... 714/36 |
| 6,883,092 B1 | * | 4/2005 | Sasaki et al. .................. 713/2 |
| 2003/0154428 A1 | * | 8/2003 | Pelner ......................... 714/36 |

FOREIGN PATENT DOCUMENTS

EP 0613094 8/1994

OTHER PUBLICATIONS

"Control Techniques and Power Saving Effects of Intermittent Operation of Radio Units", IEEE, Jun. 3, 1987, pp. 560-566.
European Search Report in corresponding application No. EP 02 25 5670, dated Mar. 18, 2004.

* cited by examiner

*Primary Examiner*—Robert Beausoliel
*Assistant Examiner*—Michael C. Maskulinski
(74) *Attorney, Agent, or Firm*—Staas & Halsey LLP

(57) ABSTRACT

A semiconductor device in which consumption of power attendant on a leakage current in a block where the power is turned on and off intermittently is reduced. In the semiconductor device according to the present invention, an error check necessity judgment circuit judges on notification from an error check necessity notification circuit located in a block where the power is not disconnected whether an error check must be made, and an error check execution circuit makes an error check on data loaded from an external memory at the time of a boot in accordance with the judgment of the error check necessity judgment circuit. An error check cannot completely be omitted. Therefore, to ensure the reliability of a system, an error check is forcedly made once whenever a boot is performed times set by an error check interval setting circuit. This shortens intermittent operation time by time taken to make an error check, resulting in a reduction in consumption of power attendant on a useless leakage current.

14 Claims, 11 Drawing Sheets

DEVICE AND METHOD FOR CHECKING BOOT ERROR IN INTERMITTENT RECEIVING OPERATION

CROSS-REFERENCE TO RELATED APPLICATIONS

This application is based upon and claims priority of Japanese Patent Application No.2001-384256, filed on Dec. 18, 2001, the contents being incorporated herein by reference.

BACKGROUND OF THE INVENTION (1) Field of the Invention

This invention relates to a semiconductor device and, more particularly, to a semiconductor device which realizes a reduction in consumption of power by periodically turning internal power on and off in a stanby state at nonuse time like large-scale integration (LSI) in portable remote terminal units used in a direct-sequence spread spectrum communication system.

In recent years microfabrication technologies have been adopted in the process for producing LSI and wiring width is approaching 0.10 μm. These microfabrication technologies increase the packaging density of transistors, but threshold voltages LSI needs to operate must be lowered. This causes the substantial problem of a leakage (quiescent) current between transistors increasing at standby time. A portable remote terminal unit, such as a cellular telephone, which is driven by a battery is always in a standby state even at nonuse time. Therefore, an increase in this leakage current will shorten nonstop telephone call time and standby time. This is a very serious problem from a practical viewpoint.

(2) Description of the Related Art

Conventionally, the power has been disconnected from sections which do not need to operate in a standby state to prevent consumption of power from increasing due to such a leakage current. In addition, in LSI, the power has been disconnected from blocks which do not need to operate to prevent consumption of power from increasing due to such a leakage current.

When the power is disconnected from what is called processors, such as a digital signal processor (DSP) and central processing unit (CPU), included in LSI, all the data the processors were processing until then will be lost. It therefore is necessary to save it in a nonvolatile memory for the reapplication of the power. That is to say, the state before the power being turned off is saved in a memory outside the LSI where the power is not disconnected. When power is reapplied, data saved in this memory will be restored.

The boot process of loading a program from an external memory is performed by a program in a processor each time the power is turned on.

FIG. 10 is a view for describing the timing with which a boot process is performed.

Each time a boot process is performed, an error detection process called checksum is performed after a program being loaded from an external memory to judge whether the program was read normally.

For example, with a cellular telephone in a standby state, power is applied only during intermittent receiving to reduce consumption of power. That is to say, the power is disconnected when intermittent receiving is not performed. At the time when a boot is performed for this intermittent receiving, error detection is performed.

This intermittent receiving is the operation of checking whether the owner of a cellular telephone had a telephone call from a base station. A cellular telephone is put into a receiving state in a cycle between, for example, one and two seconds. If there is no incoming call, then the power is disconnected.

FIG. 11 is a view for describing an intermittent receiving cycle and checksum time.

With a cellular telephone, a boot interval is the same as an intermittent receiving cycle in a standby state and is usually 1.28 or 2.56 seconds. If a cellular telephone is in a standby state, power is applied once every intermittent receiving cycle. This intermittent receiving cycle includes program load time and checksum execution time.

With a cellular telephone and the like which can be in a standby state for hundreds of hours, however, the percentage of accumulated time for which checksum is performed to the total time for which the power should be in the ON state will be high if the checksum is performed at the above boot intervals. A system cannot operate while checksum is being performed, so there are many blocks where a useless leakage current flows. This means that a battery is used wastefully. Moreover, a program is loaded every time, so a useless leakage current also flows during load time.

SUMMARY OF THE INVENTION

The present invention was made under the background circumstances as described above. An object of the present invention is to provide a semiconductor device in which consumption of power attendant on a leakage current is reduced by shortening time for which a system cannot operate.

In order to achieve the above object, a semiconductor device with an intermittent operation block where application and disconnection of the power are performed periodically and repeatedly is provided. This semiconductor device comprises an error check necessity judgment circuit for judging whether an error check must be made on data for booting loaded from an external memory by a boot process performed at the time of power being applied and an error check execution circuit for making an error check on the data for booting in the case of the error check necessity judgment circuit judging that an error check must be made.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

An overview of the present invention will now be given with reference to the drawings.

Figure 1:
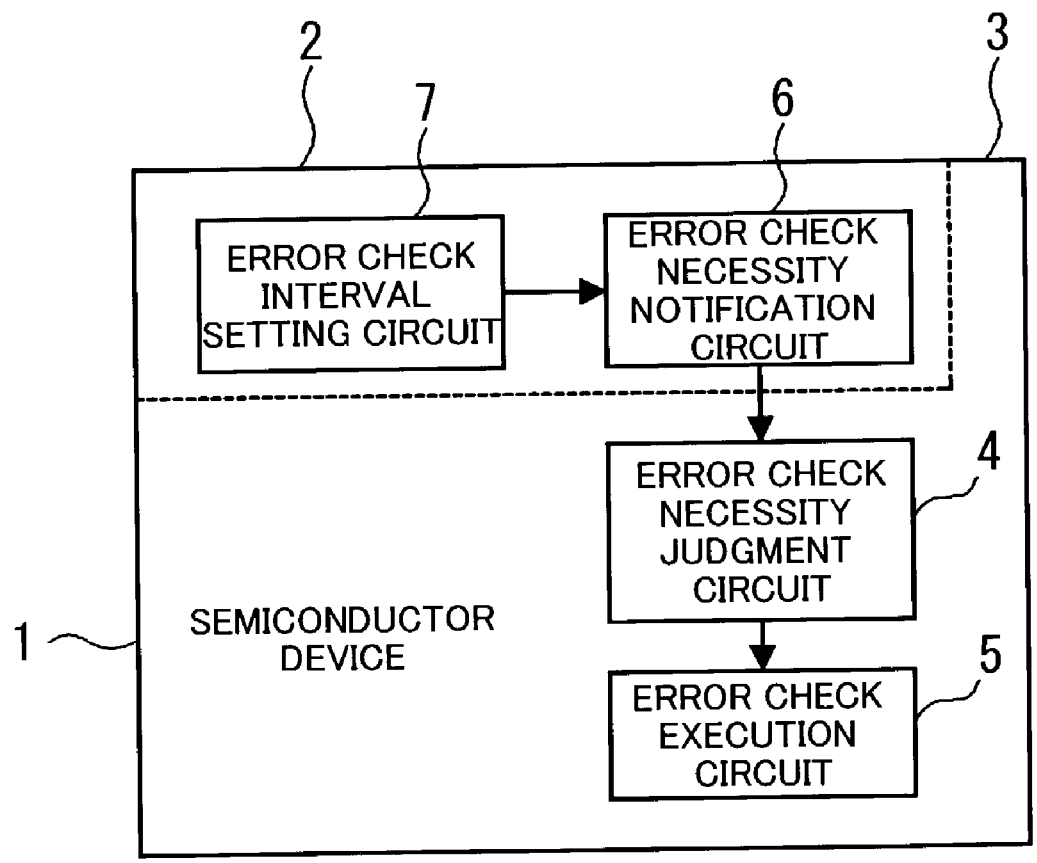
FIG. 1 is a view showing the theoretical structure of a semiconductor device according to the present invention.

FIG. 1 is a view showing the theoretical structure of a semiconductor device according to the present invention.

A semiconductor device 1 according to the present invention comprises a block 2 where power is always applied and an intermittent operation block 3 where application and disconnection of the power are performed periodically and repeatedly. The intermittent operation block 3 includes an error check necessity judgment circuit 4 and error check execution circuit 5. The block 2 includes an error check necessity notification circuit 6 and error check interval setting circuit 7.

The error check necessity judgment circuit 4 judges whether an error check must be made on data loaded from an external memory by a boot process performed at the time when power is applied. The error check execution circuit 5 makes an error check for confirming whether data was loaded normally in the case of the error check necessity judgment circuit 4 judging that an error check must be made.

The error check necessity notification circuit 6 located in the block 2 where the power is not disconnected notifies the error check necessity judgment circuit 4 of instructions about whether an error check must be made. Only when the number of times a boot was performed reaches a certain number, the error check interval setting circuit 7 causes the error check necessity notification circuit 6 to notify the error check necessity judgment circuit 4 that an error check must be made.

In the semiconductor device 1 having the above structure, the error check necessity notification circuit 6 and error check interval setting circuit 7 are located in the block 2 where the power is not disconnected. Usually the error check necessity notification circuit 6 notifies the error check necessity judgment circuit 4 that an error check is unnecessary. The error check interval setting circuit 7 counts the number of times power is applied to the intermittent operation block 3. When the number of times power is applied to the intermittent operation block 3, that is to say, the number of times a boot process is performed as a result of it reaches a certain number, the error check interval setting circuit 7 changes the value set for the error check necessity notification circuit 6 so that an error check will be made.

When power is applied to the intermittent operation block 3, data regarding a program for booting is loaded first from an external memory. The error check necessity judgment circuit 4 will be notified at this time by the error check necessity notification circuit 6 whether to make an error check, so the error check necessity judgment circuit 4 judges the contents of the notification. If an error check is unnecessary, then an error check process on the data loaded will be omitted.

When the number of times a boot is performed reaches a certain number after intermittent operation being repeated, the error check interval setting circuit 7 changes the value set for the error check necessity notification circuit 6 so that an error check will be made, and the error check necessity notification circuit 6 notifies the error check necessity judgment circuit 4. The error check necessity judgment circuit 4 therefore judges that an error check must be made. In this case, an error check will be made on the data regarding the program for booting after the data is loaded from the external memory.

As described above, the semiconductor device 1 according to the present invention can determine at the time of a boot whether to make an error check on data loaded from an external memory. As a result, there is no need to make an error check every time on data loaded each time a boot is performed. This shortens intermittent operation time by time taken to make these error checks, resulting in a reduction in consumption of power attendant on a useless leakage current.

In the above example, the block 2 where power is always applied is within the semiconductor device 1. The function of the block 2 may be located outside the semiconductor device 1. In this case, the semiconductor device 1 includes an input terminal for accepting data indicative of whether an error check must be made, and the error check necessity judgment circuit 4 will judge on data indicative of whether an error check must be made, which is accepted at this input terminal, whether an error check must be made.

Now, an embodiment of the present invention applied to LSI for cellular telephones which perform intermittent receiving will be described in detail.

Figure 2:
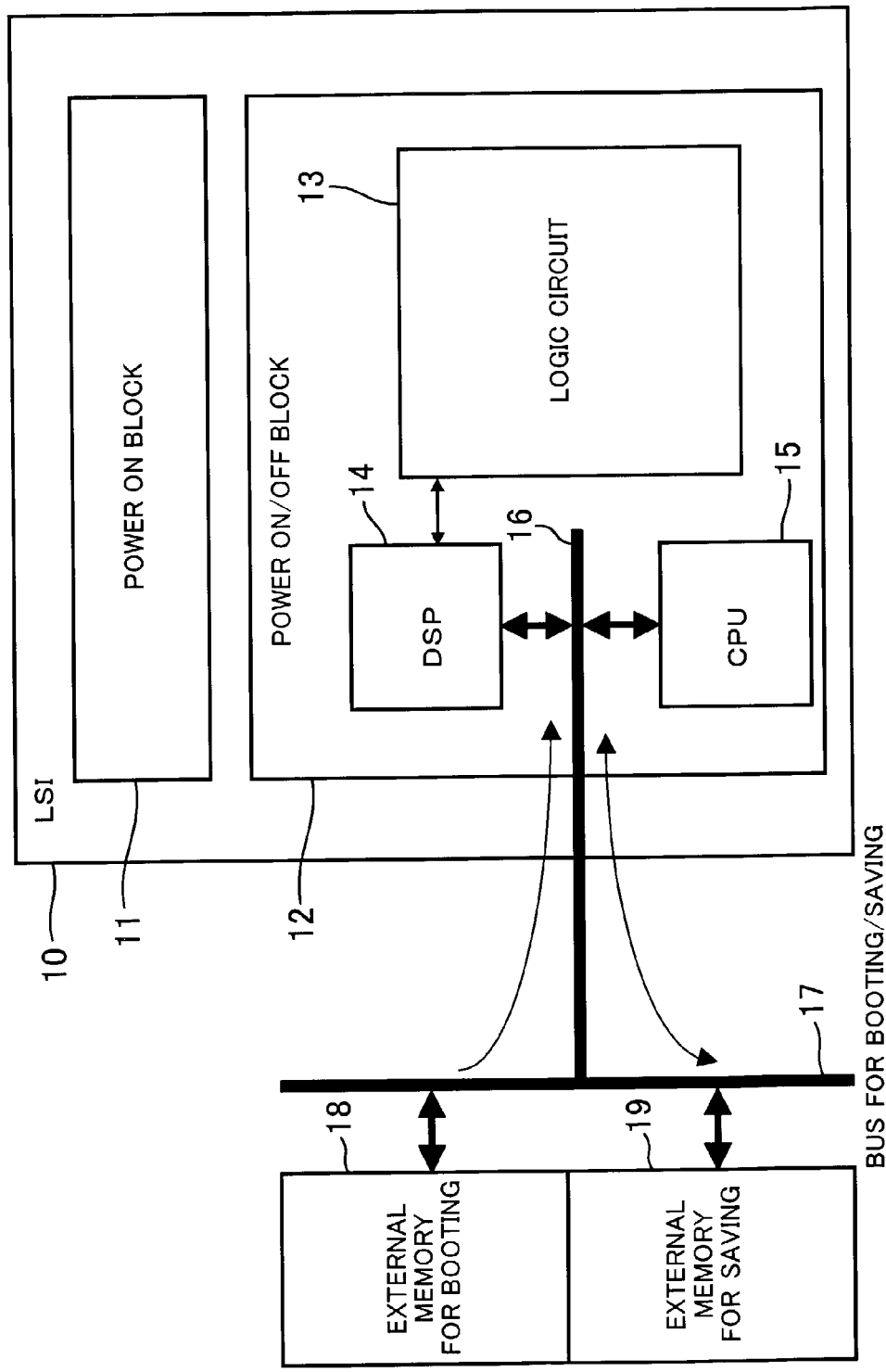
FIG. 2 is a view showing the structure of the feature of a system necessary for intermittent receiving operation.

FIG. 2 is a view showing the structure of the feature of a system necessary for intermittent receiving operation.

LSI 10 includes a power on block 11 where the power is not turned off and a power on/off block 12 where the power is turned on and off to an intermittent receiving cycle. The power on/off block 12 includes a logic circuit 13 including a modem section for modulating and demodulating signals, such as voice, and a CODEC section for performing a scramble process and error correction process, a DSP 14 for controlling the logic circuit 13, a CPU 15 for controlling the entire LSI 10, and an internal bus 16 to which the DSP 14 and LSI 10 are connected. The internal bus 16 included in the LSI 10 is connected to an external memory for booting 18 and external memory for saving 19 via an external bus for booting/saving 17.

The external memory for booting 18 outside the LSI 10 stores a program and the external memory for saving 19 stores data the DSP 14 and CPU 15 handle.

If the power is turned on and off inside the LSI 10, data which the DSP 14 and CPU 15 were processing while the power was in the ON state will be lost when the power is turned off. Therefore, the data will be saved in the external memory for saving 19 before the power is turned off. When the power to the power on/off block 12 is turned on again for intermittent receiving, a program stored in the external memory for booting 18 and data saved in the external memory for saving 19 are loaded into memories for the DSP 14 and CPU 15. At this time error detection called checksum is performed on the program loaded to check whether the program was read normally. In the present invention, this checksum will be performed at need and not each time a boot is performed.

Now, how to control whether or not this checksum is performed will be described.

Figure 3:
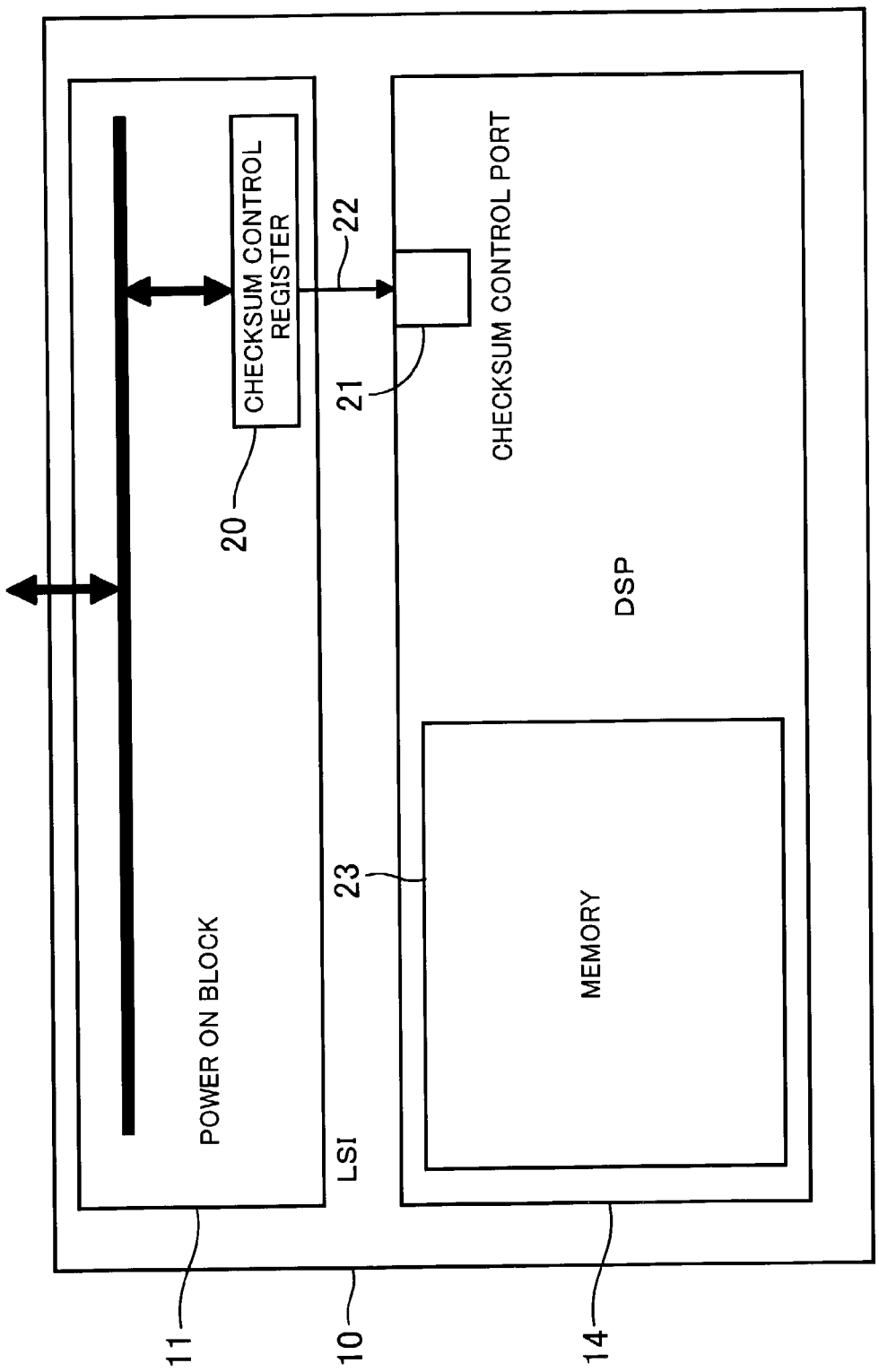
FIG. 3 is a view showing the structure of checksum control.

FIG. 3 is a view showing the structure of checksum control.

A checksum control register 20 is located in the power on block 11 in the LSI 10 where the power is not turned on or off. This checksum control register 20 holds information indicative of control whether or not checksum is performed as a flag bit. In this case, this flag bit is defined as follows. If the flag bit is "0," then checksum is performed. If the flag bit is "1," then checksum is not performed. There is a checksum control port 21 on the DSP 14 and the checksum control register 20 and checksum control port 21 connect by a signal line 22. The checksum control register 20 is controlled via a bus outside the LSI 10 or by an internal CPU. The DSP 14 and checksum control port 21 correspond to the error check necessity judgment circuit 4 shown in FIG. 1, the DSP 14 corresponds to the error check execution circuit 5, and the checksum control register 20 corresponds to the error check necessity notification circuit 6.

Now, a boot process performed on the basis of the value of the flag bit notified by the checksum control register 20 will be described.

Figure 4:
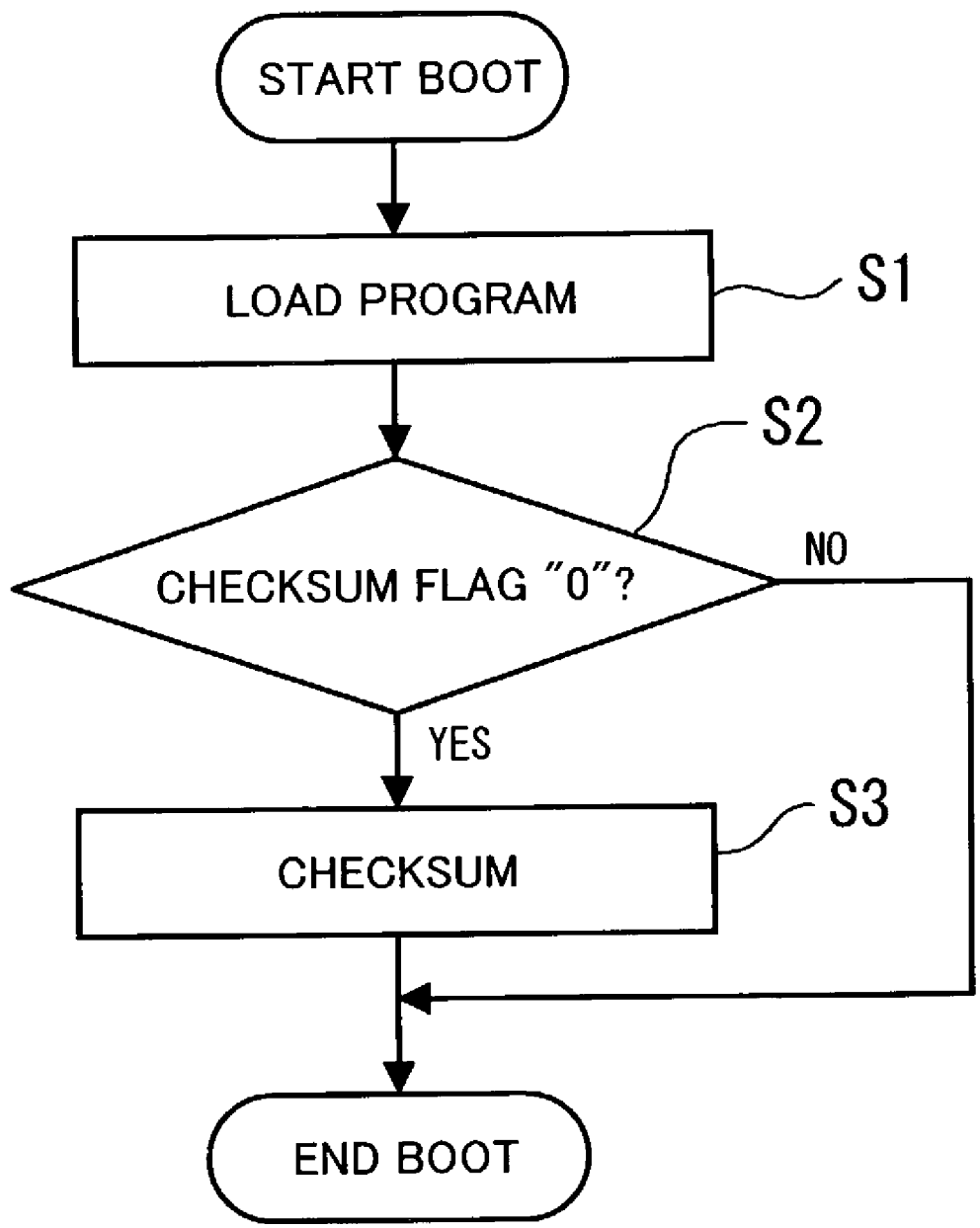
FIG. 4 is a flow chart showing the sequence of processes performed regarding boot programs.

FIG. 4 is a flow chart showing the sequence of processes performed regarding boot programs.

First, when the power to the DSP 14 in the power on/off block 12 is turned on to perform an intermittent receiving process, the DSP 14 loads a program from the external memory for booting 18 into a memory 23 (step S1). After the program being loaded, a port value at the checksum control port 21 connected to the checksum control register 20 is referred to and whether a checksum flag is "0" is judged (step S2). If the checksum flag is "0," then checksum is performed (step S3) and the boot process is ended. If the checksum flag is "1," then control is exercised so that the boot process will be ended without checksum being performed.

Figure 5:
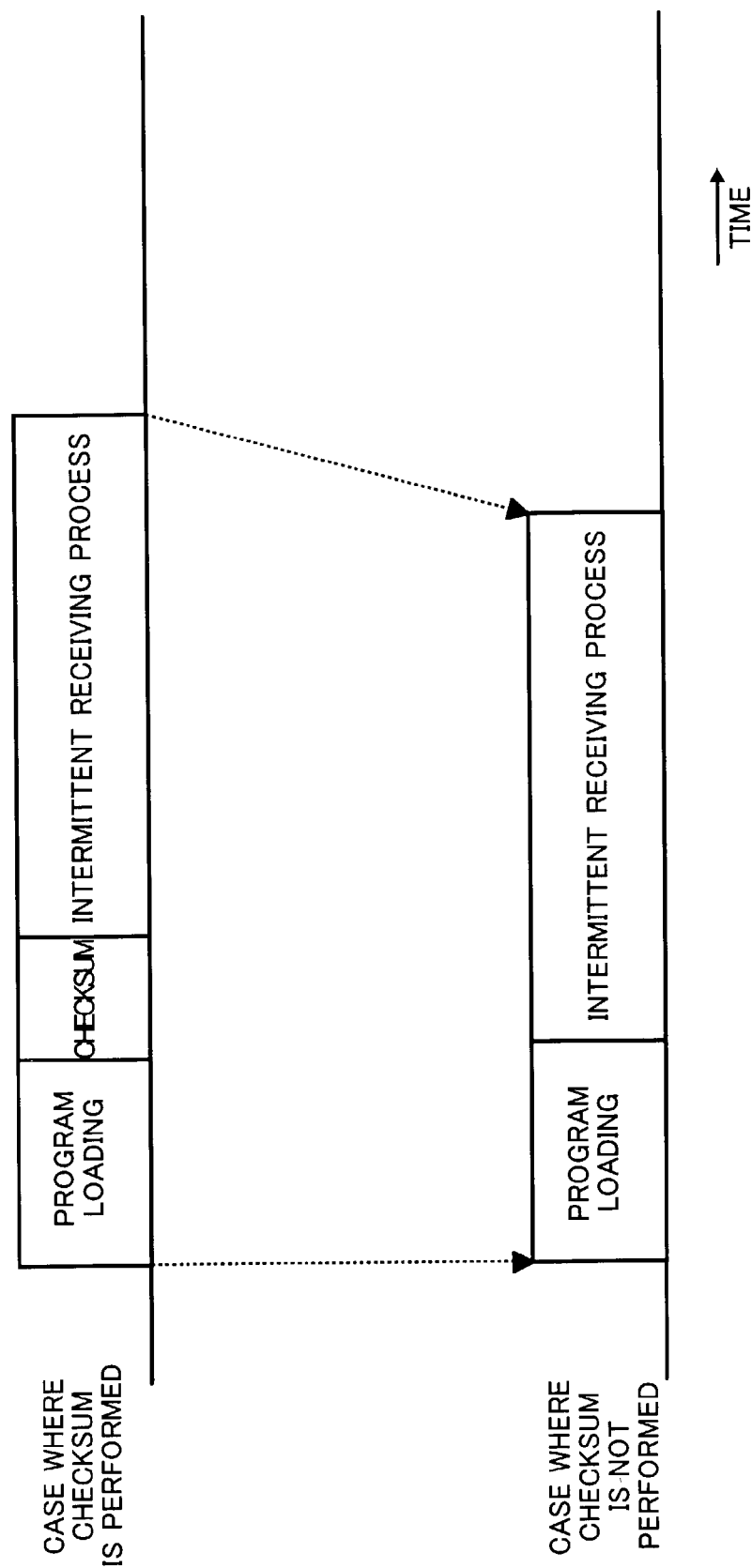
FIG. 5 is a view showing the difference between time for which the power is in the ON state in the case of checksum being performed and time for which the power is in the ON state in the case of checksum not being performed.

FIG. 5 is a view showing the difference between time for which the power is in the ON state in the case of checksum being performed and time for which the power is in the ON state in the case of checksum not being performed.

If checksum is performed at the time when a boot process is performed, then the power is in the ON state for the sum of time taken to load a program, time taken to perform checksum, and time taken to perform an intermittent receiving process of an intermittent receiving cycle. On the other hand, if checksum is omitted, then time of an intermittent receiving cycle for which the power is in the ON state can be shortened by time taken to perform checksum. If time for which the power is in the ON state is shortened, consumption of power attendant on a leakage current reduces. As a result, standby time and nonstop telephone call time can be lengthened.

However, this checksum is necessary for ensuring the reliability of a system and cannot completely be omitted. It therefore is preferable that control for periodically performing checksum should be exercised to maintain the reliability of a system.

Figure 6:
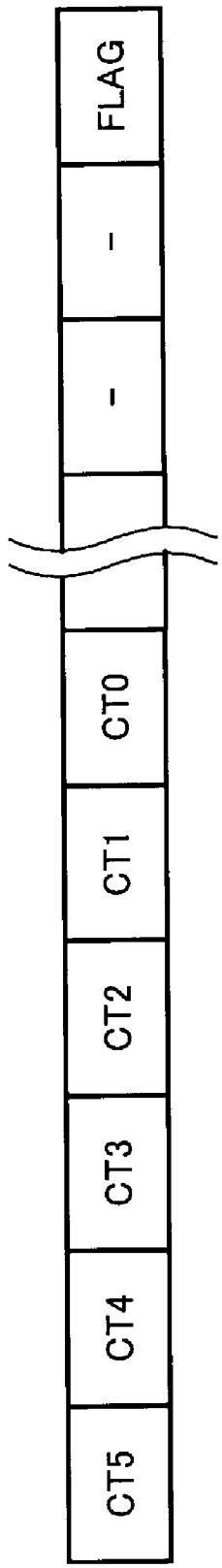
FIG. 6 is a view showing the details of a checksum control register.

FIG. 6 is a view showing the details of a checksum control register.

The checksum control register 20 includes flag bit FLAG and fields CT5 through CT0 for specifying checksum execution interval times. To improve the reliability of a system, control is exercised so that checksum will forcedly be performed one time for the number of times specified in the fields CT5 through CT0 for specifying checksum execution interval times. The power to the power on/off block 12 is turned on at the time of intermittent receiving and a boot process is performed. It is assumed that checksum execution interval times is set to, for example, 20. Then when the number of times this boot process is performed reaches 20, control is exercised so that checksum will forcedly be performed. The fields CT5 through CT0 in the checksum control register 20 correspond to the error check interval setting circuit 7 shown in FIG. 1.

Figure 7:
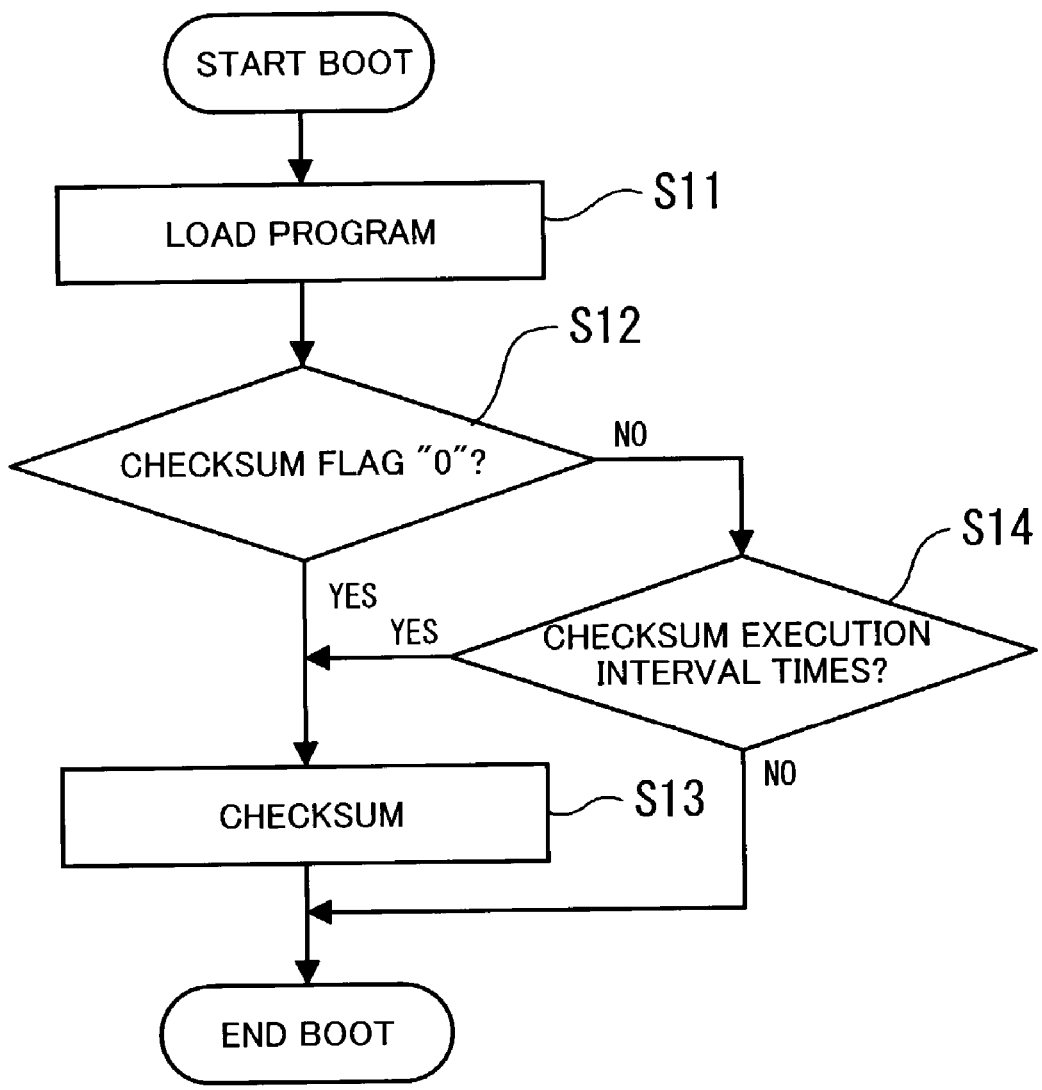
FIG. 7 is a flow chart showing the sequence of processes performed regarding a boot program which performs checksum forcedly and periodically.

FIG. 7 is a flow chart showing the sequence of processes performed regarding a boot program which performs checksum forcedly and periodically.

First, when the power to the DSP 14 in the power on/off block 12 is turned on to perform an intermittent receiving process, the DSP 14 loads a program from the external memory for booting 18 into the memory 23 (step S11). After the program being loaded, a port value at the checksum control port 21 connected to the checksum control register 20 is referred to and whether a checksum flag is "0" is judged (step S12). If the checksum flag is "0," then checksum is performed (step S13) and the boot process is ended. If the checksum flag is "1," then whether the number of times a boot process was performed has reached a checksum execution interval times is judged (step S14). If the number of times a boot process was performed has reached the checksum execution interval times, then checksum is performed forcedly (step S13) and the boot process is ended. If the number of times a boot process was performed has not reached the checksum execution interval times, then the boot process is ended without checksum being performed.

Moreover, time needed for program load performed at the time when a boot process is performed can be shortened further. Now, a method for shortening time needed for program load will be described.

Figure 8:
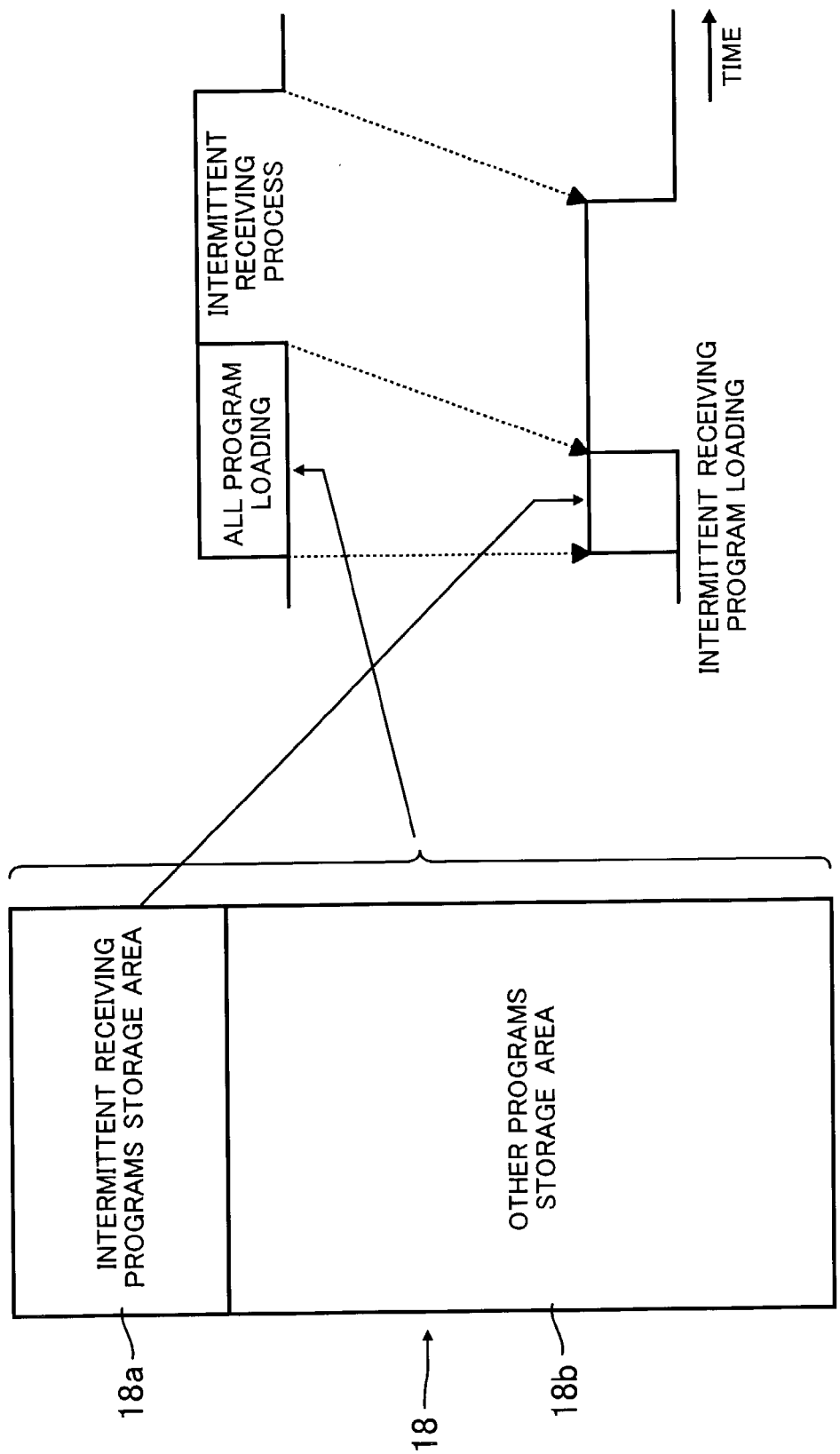
FIG. 8 is a view showing an example of dividing a program storage area in a memory.

FIG. 8 is a view showing an example of dividing a program storage area in a memory.

The external memory for booting 18 which stores programs is divided into an intermittent receiving programs storage area 18a and other programs storage area 18b. The intermittent receiving programs storage area 18a stores only programs needed for an intermittent receiving process and the other programs storage area 18b stores other programs, such as one for a telephone call process.

As a result, programs needed for an intermittent receiving process need only be loaded from the intermittent receiving programs storage area 18a at the time when a boot process is performed. Therefore, compared with a case where all the programs are loaded, time of an intermittent receiving cycle for which the power is in the ON state can be shortened. This reduces consumption of power attendant on a leakage current and the life of a battery can be lengthened.

Programs stored in the other programs storage area 18b will additionally be loaded if there is an incoming call as a result of the intermittent receiving process.

Figure 9:
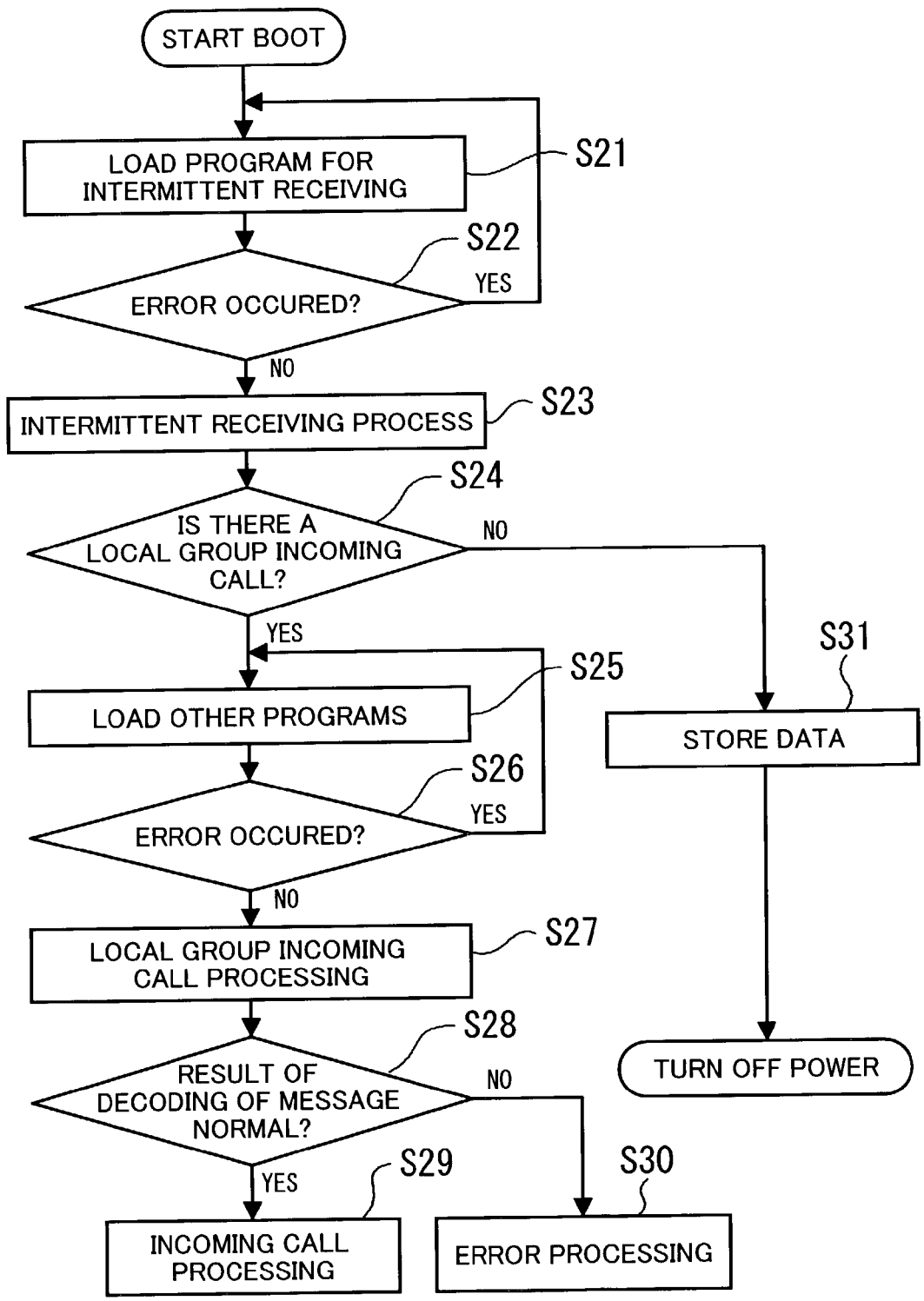
FIG. 9 is a flow chart showing the sequence of processes performed regarding divided boot programs.
Figure 10:
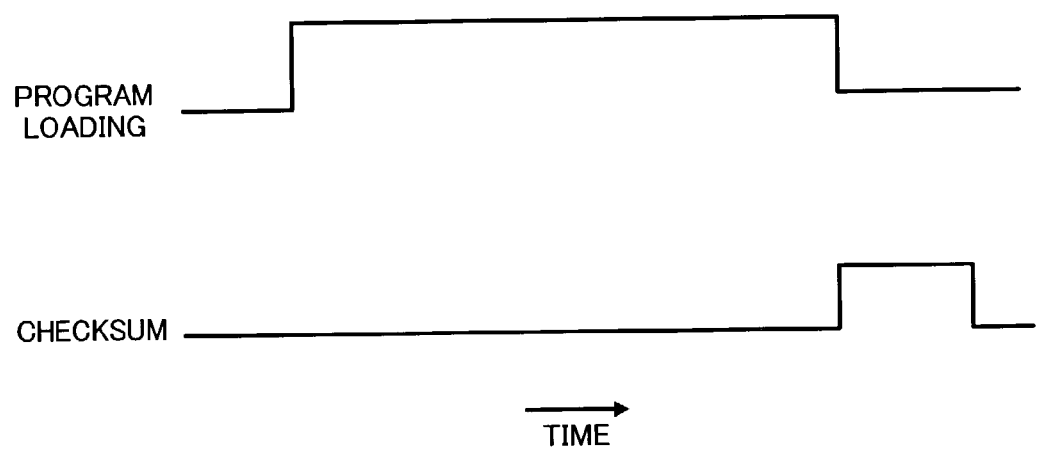
FIG. 10 is a view for describing the timing with which a boot process is performed.
Figure 11:
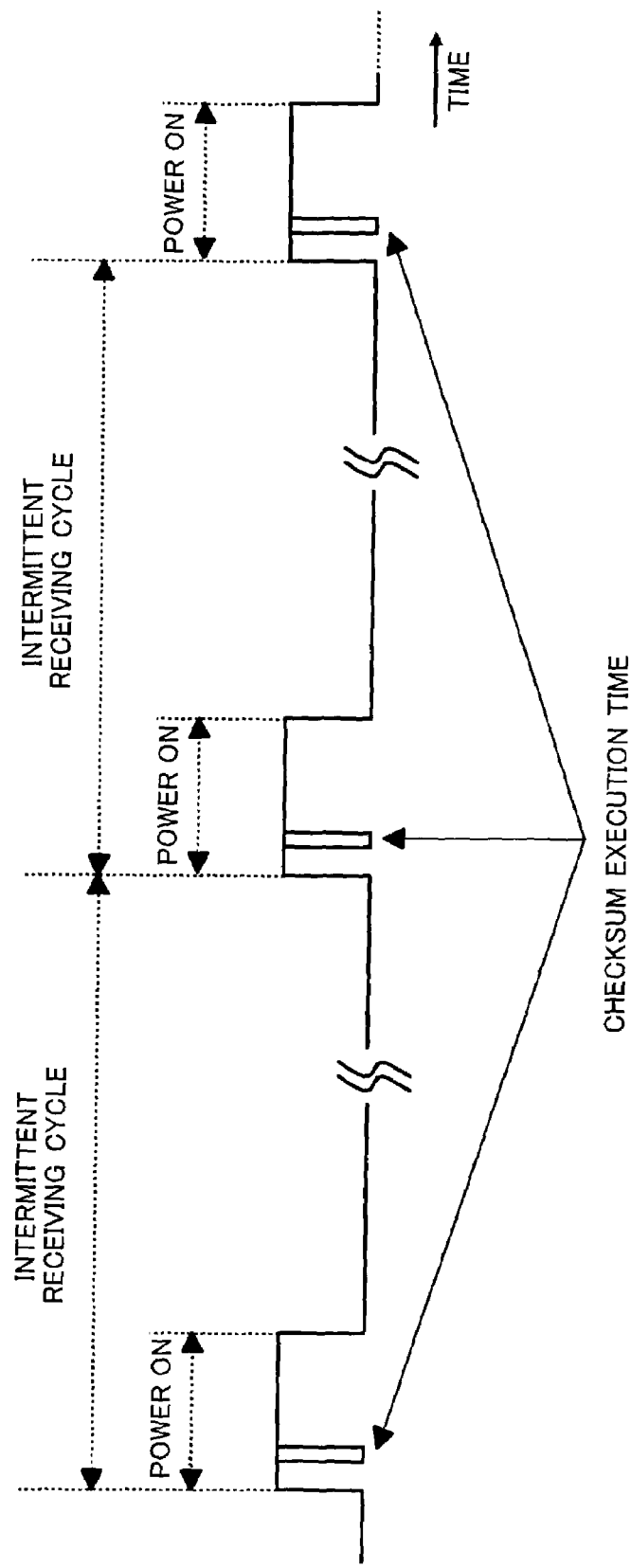
FIG. 11 is a view for describing an intermittent receiving cycle and checksum time.

FIG. 9 is a flow chart showing the sequence of processes performed regarding divided boot programs.

First, when the power to the DSP 14 in the power on/off block 12 is turned on to perform an intermittent receiving process, the DSP 14 loads a program for intermittent receiving from the intermittent receiving programs storage area 18a in the external memory for booting 18 into the memory 23 (step S21). After the program for intermittent receiving being loaded, checksum is performed to judge whether an error occurred (step S22). If an error occurred, then step S21 is repeated to reload the program for intermittent receiving. If an error is not detected by the checksum (or if checksum is omitted), then an intermittent receiving process is performed (step S23). By performing the intermittent receiving process, whether there is a local group incoming call is judged (step S24).

If there is a local group incoming call, the DSP 14 loads other programs from the other programs storage area 18b in the external memory for booting 18 (step S25). After the other programs being loaded, checksum is performed to judge whether an error occurred (step S26). If an error occurred, then step S25 is repeated to reload the other programs. If an error is not detected by the checksum (or if checksum is omitted), then local group incoming call processing is performed (step S27). Whether the result of the decoding of a message is normal is judged by this local group incoming call processing (step S28). If the result of the decoding of the message is normal, then incoming call processing is performed (S29). If the result of the decoding of the message is abnormal, then error processing is performed (step S30).

If the judgment that there is no local group incoming call is made in step S24, then data the DSP 14 and CPU 15 were processing is saved in the external memory for saving 19 (step S31) and the power is turned off.

As described above, power consumption can be reduced by omitting checksum. Even if a checksum error occurs as a result of omitting checksum, this error can be detected at the time of decoding a message. Therefore, this is not a serious impediment to operation. Moreover, when a boot is performed, the possibility that a checksum error occurs for a reason other than hardware failure is remote and does not matter.

As has been described in the foregoing, the semiconductor device according to the present invention includes an error check necessity judgment circuit for judging whether an error check must be made on data for booting loaded from an external memory at the time of a boot, and an error check will be made in accordance with a judgment made by the error check necessity judgment circuit. As a result, an error check which is made on data for booting each time intermittent operation is performed can be omitted. Therefore, time taken to perform error check processes can be shortened. That is to say, time for which the power is in the ON state can be shortened and consumption of power attendant on a leakage current can be reduced.

Furthermore, in the preferred embodiment applied to cellular telephones, only a program necessary for an intermittent receiving process is loaded at the time of a boot. This shortens time taken to load a program. Similarly, time for which the power is in the ON state can be shortened and consumption of power attendant on a leakage current can be reduced.

A reduction in consumption of power attendant on a leakage current will lengthen the lives of batteries. Moreover, smaller capacity batteries with the same life can be used, resulting in more compact, lighter portable remote terminal units.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A semiconductor device with an intermittent operation block where application and disconnection of power are performed periodically and repeatedly, the semiconductor device comprising:
   an error check necessity judgment circuit for judging whether an error check must be made on data for booting loaded from a memory where power is not disconnected by a boot process performed at the time of power being applied to perform intermittent receiving; and
   an error check execution circuit for making an error check on the data for booting in the case of the error check necessity judgment circuit judging that an error check must be made.

2. The semiconductor device according to claim 1, further comprising an input terminal for accepting error check necessity data to give instructions from the outside about whether an error check must be made, wherein the error check necessity judgment circuit judges on the error check necessity data of which the error check necessity judgment circuit is notified from the outside whether an error check must be made.

3. The semiconductor device according to claim 1, further comprising an error check necessity notification circuit for notifying the error check necessity judgment circuit of error check necessity data to give instructions about whether an error check must be made.

4. The semiconductor device according to claim 3, wherein the error check necessity notification circuit is located in a block where power is not disconnected.

5. The semiconductor device according to claim 3, wherein the error check necessity notification circuit is a control register which stores a flag bit indicative of whether an error check must be made.

6. The semiconductor device according to claim 3, further comprising an error check interval setting circuit for forcedly setting error check necessity data of which the error check necessity notification circuit notifies the error check necessity judgment circuit to data indicative that an error check must be made only at the time of the number of times a boot is performed reaching a certain number.

7. The semiconductor device according to claim 6, wherein the error check interval setting circuit is located in a block where power is not disconnected.

8. The semiconductor device according to claim 6, wherein the error check interval setting circuit can arbitrarily set the number of times the boot is performed, being a cycle in which an error check is made.

9. A portable remote terminal unit in which power to blocks unnecessary for an intermittent receiving control process is disconnected for a period when the unit in a standby state does not perform intermittent receiving, the portable remote terminal unit comprising:
   an error check necessity judgment circuit for judging whether an error check must be made on data for booting loaded from a memory where power is not disconnected by a boot process performed at the time of power being applied to perform the intermittent receiving;
   an error check execution circuit for making an error check on the data for booting in the case of the error check necessity judgment circuit judging that an error check must be made;
   an error check necessity notification circuit for notifying the error check necessity judgment circuit whether an error check must be made; and
   an error check interval setting circuit for causing the error check necessity notification circuit to notify the error check necessity judgment circuit that an error check must be made at the time of the number of times a boot is performed reaching a certain number.

10. The portable remote terminal unit according to claim 9, wherein the error check necessity notification circuit and the error check interval setting circuit are located in a block where power is not disconnected.

11. The portable remote terminal unit according to claim 9, wherein the error check interval setting circuit can arbitrarily set the number of times the boot is performed, being a cycle in which an error check is made.

12. An intermittent receiving method in which power to blocks in a portable remote terminal unit unnecessary for an intermittent receiving control process is disconnected for a period when the unit in a standby state does not perform intermittent receiving, the intermittent receiving method comprising the steps of:
- applying power to blocks in the portable remote terminal unit necessary for an intermittent receiving control process at the time of intermittent receiving;
- loading only a program necessary for the intermittent receiving control process from an external memory;
- judging whether the number of times a boot is performed has reached a certain number; and
- making an error check on the program loaded at the time of the number of times the boot is performed reaching a certain number.

13. The intermittent receiving method according to claim 12, further comprising the step of loading remaining programs from the memory in the case of there being a local group incoming call at the time of the intermittent receiving control process.

14. A portable remote terminal unit in which power to blocks unnecessary for an intermittent receiving control process is disconnected for a period when the unit in a standby state does not perform intermittent receiving, the portable remote terminal unit comprising:
- an error check necessity judgment circuit for judging whether an error check must be made on data for booting loaded from a memory where power is not disconnected by a boot process performed at the time of power being applied to perform the intermittent receiving; and
- an error check execution circuit for making an error check on the data for booting in the case of the error check necessity judgment circuit judging that an error check must be made.

* * * * *